(12) United States Patent
Hakoda et al.

(10) Patent No.: US 8,239,058 B2
(45) Date of Patent: *Aug. 7, 2012

(54) METHOD FOR CONTROLLING MOLD CLAMPING DEVICE

(75) Inventors: Takashi Hakoda, Nagano-ken (JP);
Isamu Komamura, Nagano-ken (JP);
Haruo Okada, Nagano-ken (JP);
Kiyoshi Nakamura, Nagano-ken (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 578 days.

This patent is subject to a terminal disclaimer.

(21) Appl. No.: 12/392,799

(22) Filed: Feb. 25, 2009

(65) Prior Publication Data

US 2009/0214688 A1 Aug. 27, 2009

(30) Foreign Application Priority Data

Feb. 26, 2008 (JP) ................................. 2008-044771

(51) Int. Cl.
*B29C 45/03* (2006.01)

(52) U.S. Cl. ..................... 700/200; 264/40.5; 425/150

(58) Field of Classification Search .............. 425/150; 264/40.7
See application file for complete search history.

(56) References Cited

U.S. PATENT DOCUMENTS

| | | | | |
|---|---|---|---|---|
| 5,219,584 A | * | 6/1993 | Itsuzi et al. | 425/150 |
| 5,861,118 A | * | 1/1999 | Hokino et al. | 264/40.1 |
| 5,863,475 A | * | 1/1999 | Ueda | 264/40.5 |
| 6,761,552 B2 | * | 7/2004 | Fujita | 425/145 |
| 7,798,799 B2 | * | 9/2010 | Shiozawa et al. | 425/149 |
| 2008/0089964 A1 | * | 4/2008 | Kianpour et al. | 425/150 |

FOREIGN PATENT DOCUMENTS

JP 9-222924 A 8/1997

OTHER PUBLICATIONS

Hydraulik, "D 7960 E Variable Displacement Axial Piston Pump" Catalog, Hawe Hydraulik GMBH & Company, Muchen, DE, Mar. 2006.*

* cited by examiner

*Primary Examiner* — Kakali Chaki
*Assistant Examiner* — Walter Hanchak
(74) *Attorney, Agent, or Firm* — Birch, Stewart, Kolasch & Birch, LLP

(57) ABSTRACT

A predetermined speed control pattern A is set. In controlling mold opening, in the mold opening section Zm, mold opening control is performed at the mold opening speed Vm, and based on a current mold opening speed Vd and a current mold opening position Xd, which are both detected, a deceleration starting position Xmc of the deceleration section Zmd where a current mold opening speed Vd becomes a zero (O) at a virtual stop position Xso is sequentially forecasted at each predetermined time interval by calculation. Upon reaching the deceleration starting position Xmc the deceleration section Zmd is started, and in the deceleration section Zmd, based on the detected current mold opening position Xd, a speed command value Dm corresponding to the speed control pattern A is obtained sequentially by calculation, and according to the speed command value Dm deceleration control is performed. Upon reaching a last-transition speed Vc, a predetermined stop controlling processing is performed.

14 Claims, 5 Drawing Sheets

METHOD FOR CONTROLLING MOLD CLAMPING DEVICE

TECHNICAL FIELD

This invention relates to a method for controlling a mold clamping device which performs mold opening control by driving a mold clamping cylinder by a hydraulic pump.

BACKGROUND ART

Generally, a hydraulic-type injection molding machine has an aspect that it is difficult to precisely control a position and a speed compared to an electromotive-type injection molding machine. In other words, in the case of the hydraulic type, as it uses hydraulic oil and a hydraulic actuator, viscosity, volume, and the like of the hydraulic oil changes according to temperature, and an inertial force is generated in the hydraulic actuator. These physical behaviors directly affect the control precision and responsiveness. In the case where, as a hydraulic pump, a variable discharge type hydraulic pump capable of controlling a discharge flow rate by varying the number of revolutions of a drive motor is used, length of the hydraulic circuit from the hydraulic pump to the hydraulic actuator gets longer, thereby influence of changes in viscosity, volume, and the like of the hydraulic oil being larger. When supposing, as a hydraulic actuator, for example, a mold clamping cylinder equipped in a mold clamping device, even though feedback control is carried out for the positions, mold opening positions (mold opening stop positions) largely vary among shots, causing unnecessary overrun of the movable mold, furthermore a trouble such as breakage and damage from colliding a molded product taking-out device with a mold (three-plate mold). This problem is more serious, when a mold opening time period is accelerated to shorten a molding cycle time in order to increase productivity.

Meanwhile, hitherto, a control method which aims at obtaining a precise mold opening position in a mold clamping device is known. JP 09-222924 A (Patent literature 1) discloses a method for controlling a mold-opening completion position in a direct pressure-type mold clamping device in which, with allowing a mold open process, eventually a molding cycle, to be shortened, variation in stop positions at the times of mold opening completion of a movable platen is corrected thereby to reduce the variation range, and suppress and prevent product mischucking by a taking-out machine. This method for controlling a mold-opening completion position works as follows: in a direct pressure-type mold clamping device, when the mold opening speed is switched from a high-speed mold opening section to a low-speed mold opening section to complete the mold open process, the high-speed mold opening section is longer while the low-speed mold opening section is as short as possible, thereby shortening the mold open process; and a distance of the stop position of the movable platen from its reference position at the time of the mold opening completion is sampled successively plural times as the mold opening operation is repeated and, when the variation range of the sampled distances exceeds the permissible range of the target stop position precision of the movable platen, the switching position from the high-speed mold opening section to the low-speed mold opening section is corrected to hold the variation range within the permissible range.

SUMMARY OF INVENTION

Technical Problem

However, the abovementioned method for controlling a mold clamping device in the past (the method for controlling a mold-opening completion position in a direct pressure-type mold clamping device) has the following problems.

Firstly, since the basic technique thereof does not lessen variation of the stop positions by positively improving control precision of a stop position, the variation always occurs within the permissible range. Therefore, control precision higher than this permissible range cannot be secured, which imposes a limitation as a countermeasure for preventing product mischucking from occurring and the like.

Secondly, since variation of the stop positions is lessen by correcting the switching position from the high-speed mold opening section to the low-speed mold opening section, variation of the length of molding cycle time occurs. Consequently, this causes reduction in and variation of productivity, and possibly leads to significant influence on the production schedule such as delivery delay.

Solution to Problem

In order to solve the abovementioned problems, the method for controlling a mold clamping device $1c$ according to the present invention is characterized as follows: at the inception of performing mold opening control by driving a mold clamping cylinder $3$ by a hydraulic pump $2$, preliminarily setting a predetermined speed control pattern A having, at least, a mold opening section Zm in which mold opening is performed at a predetermined mold opening speed Vm, a deceleration section Zmd in which the speed is gradually decelerated from an end point (Xmc) of the mold opening section Zm toward a virtual stop position Xso, and a last-transition section Zc for which a predetermined last-transition speed Vc is set before the virtual stop position Xso; in controlling mold opening, in the mold opening section Zm, performing mold opening control at the mold opening speed Vm, and sequentially forecasting, based on a current mold opening speed Vd and a current mold opening position Xd, which are both detected, a deceleration starting position Xmc of the deceleration section Zmd where a current mold opening speed Vd becomes a zero (O) at a virtual stop position Xso, at each predetermined time interval by calculation; starting the deceleration section Zmd upon reaching the deceleration starting position Xmc, and in the deceleration section Zmd, obtaining, based on a detected current mold opening position Xd, a speed command value Dm corresponding to the speed control pattern A sequentially by calculation, and according to the speed command value Dm, performing decelerated mold opening processing; and upon reaching a last-transition speed Vc, performing a predetermined stop controlling processing.

Advantageous Effects of Invention

The method for controlling a mold clamping device $1c$ according to the present invention exhibits the remarkable advantageous effects as follows.

(1) Even though viscosity, volume, and the like of the hydraulic oil in the hydraulic circuit are changed depending on temperature and an inertial force exists in the mold clamping cylinder $3$, in controlling mold opening, the mold opening control is so performed as to control according to a preliminarily-set speed control pattern A, thereby improving the control precision with respect to a mold opening position (stop positions Xso, Xe) and thus reducing variation in the mold opening positions of respective shots drastically. Consequently, unnecessary overrun of a mold (movable mold) and a trouble such as breakage and damage from colliding a molded product taking-out device with a mold (three-plate mold) can be avoided surely. And conditions can be determined more simply without restriction caused by such troubles.

(2) Since a precise mold opening position (stop positions Xso, Xe) can be achieved and variation in mold opening positions of respective shots is reduced, constant molding cycle time can be always secured and a molding cycle time can be accelerated. As a consequence, this makes it possible to avoid lowering and varying the productivity, thereby to smoothly and surely carry out the production schedule and increase productivity.

(3) According to a preferable mode of the invention, as a hydraulic pump 2, a variable discharge type hydraulic pump 2s, which is capable of controlling a discharge flow rate by varying the number of revolutions of the servomotor 11, is used, thereby to inverter control the hydraulic pump 2s, resulting in improvement in energy saving and a reduction in running costs. In addition, particularly, the control method according to the invention achieves a larger effect when it is applied to a mold clamping device 1c equipped with such a variable discharge type hydraulic pump 2s, which is largely affected by physical variation such as temperature in the hydraulic oil.

(4) According to a preferable mode of the invention, a sub-tank 13 is attached to the mold clamping cylinder 3, and in the mold opening section Zm and the deceleration section Zmd, such control is performed that the sub-tank 13 is connected to a rear oil chamber 3r of the mold clamping cylinder 3 so as for the hydraulic oil in the rear oil chamber 3r to be flowed into the sub-tank 13. Therefore, mold opening can be performed at higher speed and with higher responsiveness. Particularly, the control method according to the present invention is applied to such a mold clamping device 1c in which mold opening can be performed at higher speed and with higher responsiveness, thereby to achieve a larger effect.

(5) According to a preferable mode of the invention, in the deceleration section Zmd, a time period Td required for the deceleration section Zmd is set, and then the time period between the deceleration starting position Xmc of the deceleration section Zmd and the virtual stop position Xso is so controlled as to be the fixed required time period Td. This provides more stable and precise position control with respect to the virtual stop position Xso.

(6) According to a preferable mode of the invention, in the stop control processing, control in which, at a stop position, any outflow and inflow of the hydraulic oil to the mold clamping cylinder 3 is cut, and operation of the hydraulic pump 2 is delayed for a predetermined time period and then stopped, is performed. This allows avoiding a malfunction in which a mold (movable mold) moves in a closing direction thereof by the pressure inside the hydraulic circuit being negative. As a result, the mold can be stably and surely stopped at the mold opening position (Xso).

(7) According to a preferable mode of the invention, as the stop control processing, control in accordance with a preliminarily-set last speed control pattern Ar is performed, and then upon reaching a final stop speed Ve, a predetermined final stop processing is performed. This makes it possible to stop at the mold opening stop position Xe more stably and precisely.

(8) According to a preferable mode of the invention, in a last deceleration section Zrd, a last time period Tr required for the last deceleration section Zrd is set, and then the time period between the deceleration starting position Xrc of the last deceleration section Zrd and the mold opening stop position Xe is so controlled as to be the fixed last required time period Tr. This provides more stable and precise position control with respect to the mold opening stop position Xe.

(9) According to a preferable mode of the invention, in the last mold opening section Zr and the last deceleration section Zrd, the mold clamping cylinder 3 is connected to the meter-out circuit 14 to perform meter-out control. This makes it possible to perform speed control in the last mold opening section Zr and the last deceleration section Zrd, which are relatively low speed sections, stably and precisely.

(10) According to a preferable mode of the invention, as the final stop processing, control in which, at a stop position, any outflow and inflow of the hydraulic oil to the mold clamping cylinder 3 is cut, and operation of the hydraulic pump 2 is delayed for a predetermined time period Te and then stopped, is performed. This allows avoiding a malfunction in which a mold (movable mold) moves in a closing direction thereof by the pressure inside the hydraulic circuit being negative. As a result, the mold can be stably and surely stopped at the mold opening stop position Xe.

(11) According to a preferable mode of the invention, before the mold opening section Zm, an initial mold opening section Zf in which mold opening is performed at an initial speed Vf lower than the mold opening speed Vm is set. This makes it possible to perform mold separating processing for separating the movable mold from the fixed mold smoothly and better at the beginning of mold opening.

(12) According to a preferable mode of the invention, in the initial mold opening section Zf, the mold clamping cylinder 3 is connected to the meter-out circuit 14 to perform meter-out control. This makes it possible to perform speed control in the initial mold opening section Zf, which is a relatively low speed section, stably and precisely.

DESCRIPTION OF EMBODIMENTS

The invention will now be described in greater detail with preferred embodiments of the invention and drawings attached. However, it should be appreciated that the drawings attached are given not to specify the invention, but to facilitate understanding of the invention. In addition, detail description of a well-known part of the invention is omitted to avoid that the invention becomes unclear.

Firstly, a configuration of a mold clamping device $1c$ arranged in an injection molding machine 1, by which the control method according to this embodiment can be implemented, will be explained, with reference to FIG. 3.

Figure 3:
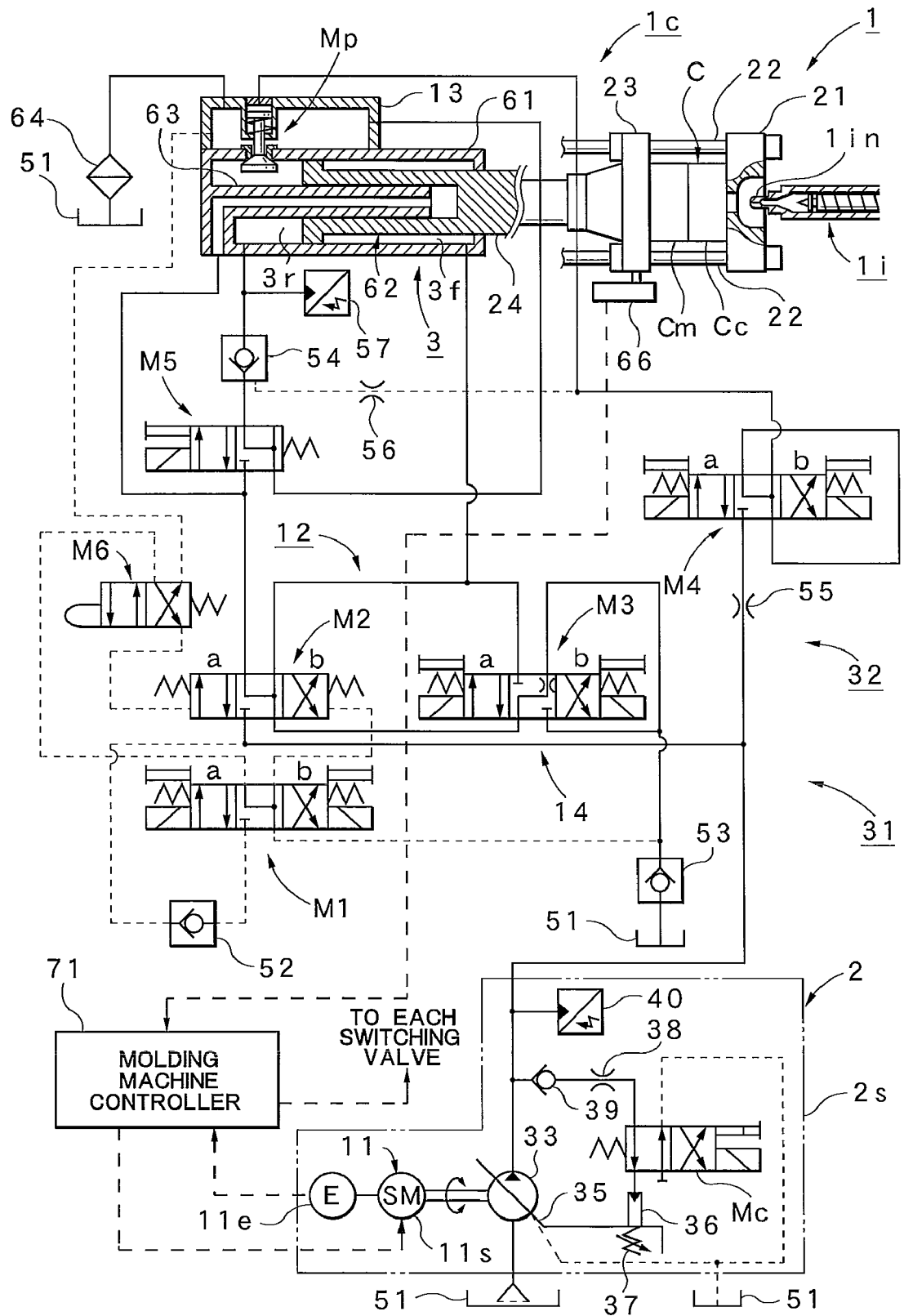
FIG. 3 shows a configuration of a mold clamping device capable of implementing the control method.

In FIG. 3, 1 designates an injection molding machine, which is provided with an injection device $1i$ and a mold clamping device $1c$. The mold clamping device $1c$ has a fixed platen 21 which is fixed in a molding machine bed (not shown), and a plurality of tie bars 22 . . . which dispose from this fixed platen 21 to a pressure receiving platen (not shown), and a movable platen 23 which is slidably fitted to these tie bars 22 . . . . In addition, to the pressure receiving platen, a mold clamping cylinder 3 is fixed, and a piston 24 housed in the mold clamping cylinder 3 is coupled to the movable platen 23. A fixed mold Cc is mounted to the fixed platen 21, and a movable mold Cm is mounted to the movable platen 23. The fixed mold Cc and the movable mold Cm constitute a mold C. This allows drive controlling the mold clamping cylinder 3 to move the movable platen 23 (movable die Cm) forward or backward, thereby closing (mold clamping) or opening the mold C. Besides, the injection device $1i$ can inject and fill a melted resin in a cavity of the mold C by carrying out a nozzle touch with an injection nozzle 1 in on the mold C (fixed mold Cc).

Furthermore, the mold clamping device $1c$ is provided with a hydraulic drive part 31 including the mold clamping cylinder 3, and this hydraulic drive part 31 is controlled by a molding machine controller 71. The hydraulic drive part 31 is provided with a variable discharge type hydraulic pump $2s$ (hydraulic pump 2), which serves as a hydraulic drive source, and a hydraulic circuit 32. The hydraulic pump $2s$ has a pump body 33 and a servomotor $11s$ (drive motor 11) for rotationally driving the pump body 33. As the servomotor $11s$, an AC servomotor connected to an output port of the molding machine controller 71 is used. To the servomotor $11s$, a rotary encoder $11e$ for detecting the number of revolutions of the servomotor $11s$ is attached, and the rotary encoder $11e$ is connected to an input port of the molding machine controller 71.

Besides, the pump body 33 is composed of a swash plate type piston pump. Therefore, the pump body 33 has a swash plate 35. When an inclination angle of the swash plate 35 (swash plate angle) is larger, a stroke of the pump piston in the pump body 33 is larger, and then the discharge flow rate increases. When a swash plate angle is smaller, a stroke of the pump piston therein is smaller, and then the discharge flow rate decreases. Thus, by setting the swash plate angle at a predetermined angle, a fixed discharge flow rate, which means that a discharge flow rate is fixed at a predetermined rate, can be set. Furthermore, to the swash plate 35, a control cylinder 36 and a return spring 37 are attached. The control cylinder 36 is connected to a discharge port of the pump body 33 via a switching valve (solenoid valve) Mc, a throttle 38, and a check valve 39. This allows an angle of the swash plate 35 (swash plate angle) to be changed by controlling the control cylinder 36. Incidentally, 40 designates a pump pressure sensor.

An inlet port of the pump body 33 is connected to an oil tank 51 and the discharge port of the pump body 33 is connected to the hydraulic circuit 32. In this way, as a hydraulic pump 2, a variable discharge type hydraulic pump $2s$, which is capable of controlling a discharge flow rate by varying the number of revolutions of the servomotor $11s$, is used, thereby to inverter control the hydraulic pump $2s$, resulting in improvement in energy saving and a reduction in running costs. In addition, particularly, the control method according to the invention achieves a larger effect when it is applied to a mold clamping device $1c$ equipped with such a variable discharge type hydraulic pump $2s$, which is largely affected by physical variation such as temperature in the hydraulic oil.

The hydraulic circuit 32, as shown in FIG. 3, is equipped with a pilot switching valve (solenoid valve) M1 for switching the main operations, a direction switching valve M2, a direction switching valve (solenoid valve) M3 in which a throttle is housed, a switching valve (solenoid valve) M4 for switching a prefill valve Mp arranged in a sub-tank 13, which will be mentioned later, a switching valve (solenoid valve) M5 for switching the mold clamping operations, and a switching valve M6 forming a safety circuit. The hydraulic circuit 32 is connected in such a way shown in FIG. 3, to configure a hydraulic system circuit. Incidentally, 52, 53, 54 designate check valves, 55, 56 designate throttles, and 57 designates a cylinder pressure sensor. Besides, the mold clamping cylinder 3 is provided with a cylinder body 61, and a piston 24 which is housed in the cylinder body 61. The piston 24 also serves as a high-speed cylinder part 62. A booster ram 63 forwardly projected from a rear end of the cylinder body 61 is inserted into the oil chamber of the high-speed cylinder part 62. Furthermore, a sub-tank 13 is attached to the cylinder body 61. Between the sub-tank 13 and a rear oil chamber $3r$, a prefill valve Mp for connecting and disconnecting the sub-tank 13 and rear oil chamber $3r$ is arranged, and the sub-tank 13 is connected to an oil tank 51 via an oil cooler 64. Thus, the mold clamping device $1c$ according to this embodiment forms a booster ram type mold clamping mechanism.

The hydraulic circuit 32 includes a differential circuit 12 and a meter-out circuit 14. The direction switching valve M3 mainly forms the meter-out circuit 14 and the direction switching valves M2, M3 mainly form the differential circuit 12. Each of the switching valves M1, M3, M4, M5 . . . is connected to the output port of the molding machine controller 71. This allows each of the switching valves M1 . . . to be sequentially controlled by the molding machine controller 71. Furthermore, 66 designates a position sensor for detecting a position (mold position) of the movable mold Cm, and the position sensor 66 is connected to an input port of the molding machine controller 71.

Figure 1:
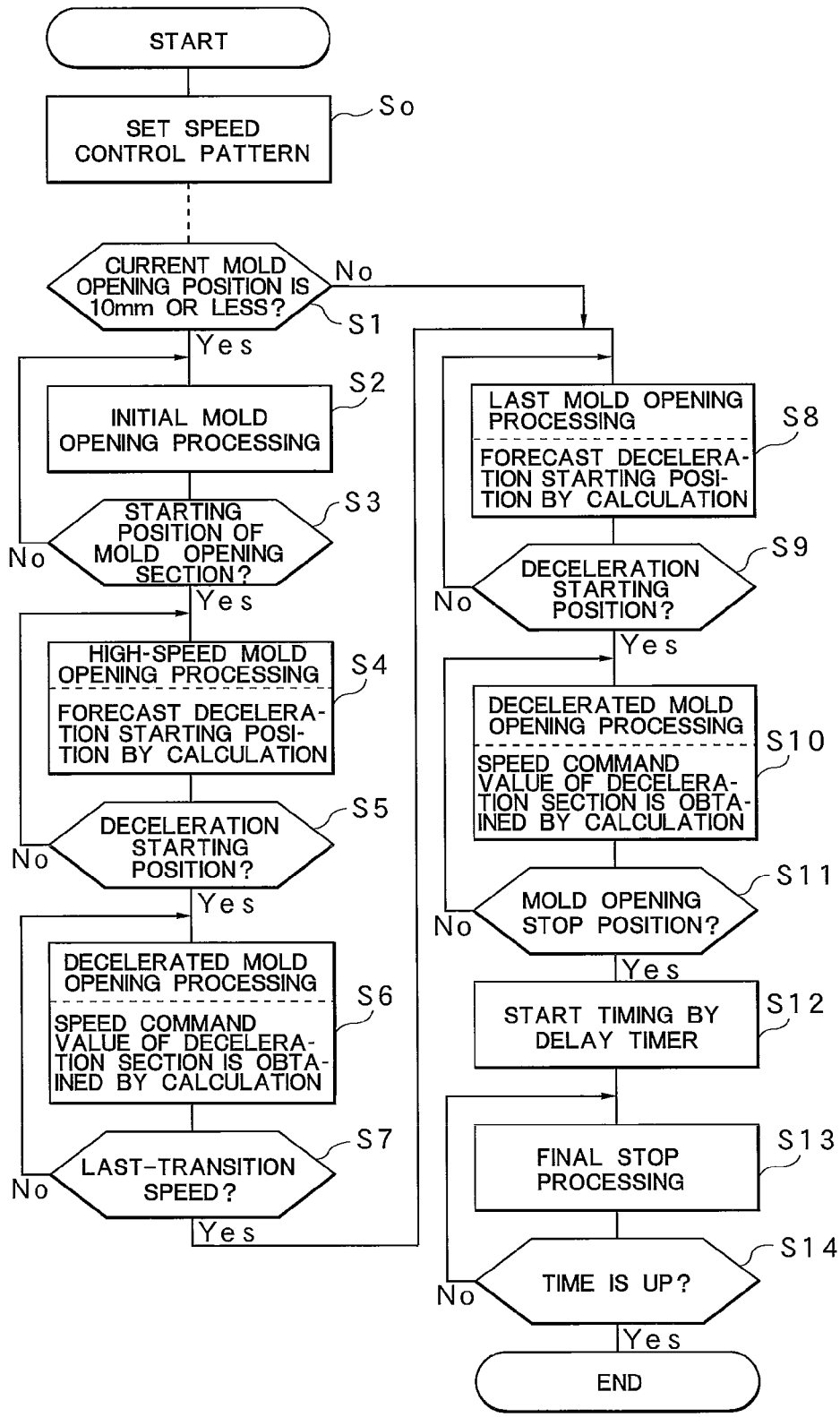
FIG. 1 is a flow chart for explaining a processing procedure of the control method according to a preferable embodiment of the present invention.

Now, the control method according to this embodiment, which includes a mold opening operation of the mold clamping device $1c$ having such a configuration, will be explained according to the flow chart shown in FIG. 1, with reference to FIGS. 2 and 3.

Figure 2:
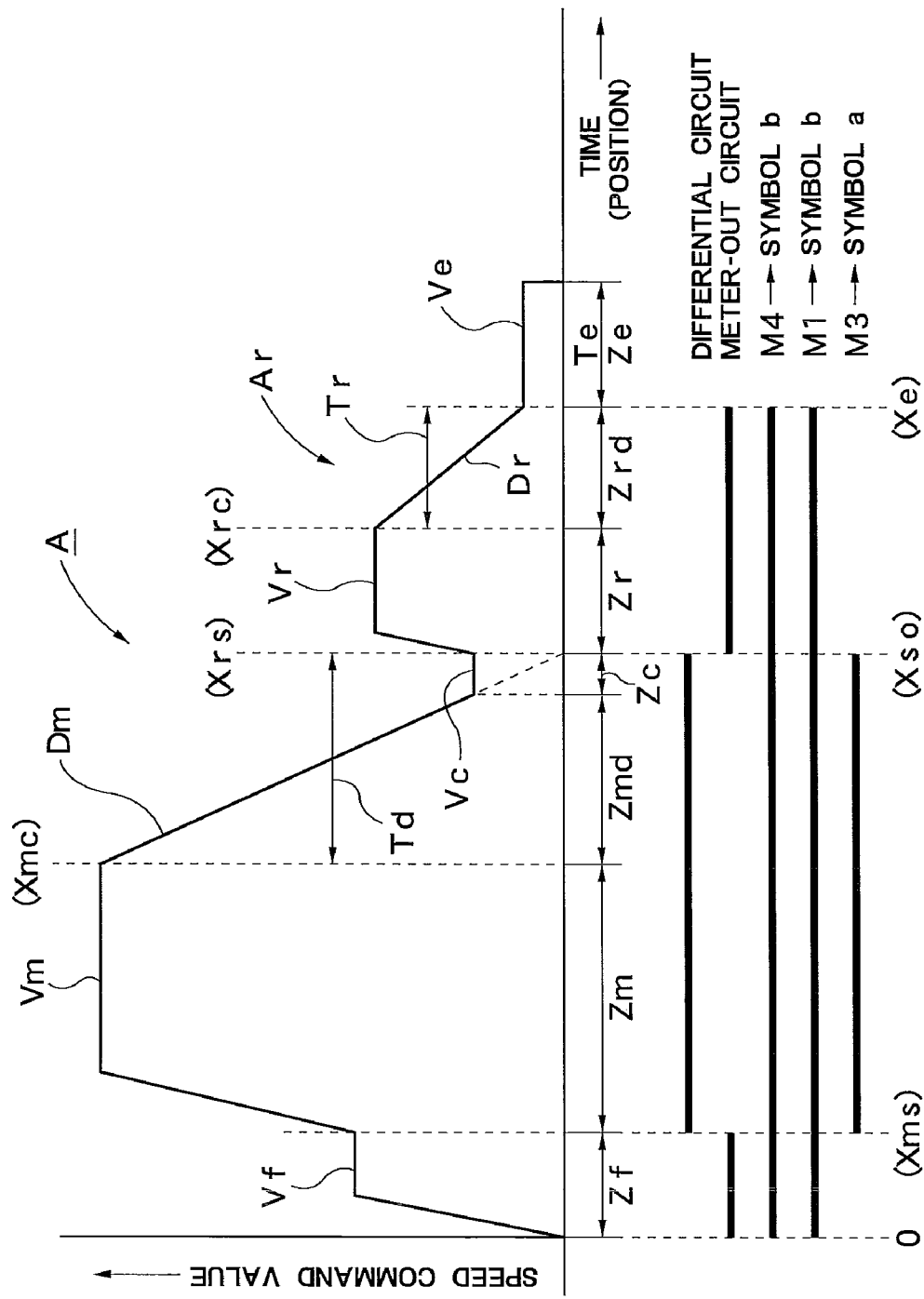
FIG. 2 shows a speed control pattern used for the control method.

Firstly, preliminarily, a speed control pattern A shown in FIG. 2 is set (Step So). The speed control pattern A includes at least a mold opening section Zm in which mold opening is performed at a predetermined mold opening speed Vm, a deceleration section Zmd in which the speed is gradually decelerated from the end point (Xmc) of the mold opening section Zm toward a virtual stop position Xso, and a last-transition section Zc for which a predetermined last-transition speed Vc is set before the virtual stop position Xso. The illustrated speed control pattern A further includes an initial mold opening section Zf in which mold opening is performed at an initial speed Vf lower than the mold opening speed Vm, and a predetermined last speed control pattern Ar. In this case, the last speed control pattern Ar includes a last mold opening section Zr in which mold opening is performed at the last speed Vr set at a speed lower than the mold opening speed Vm, and a last deceleration section Zrd in which the speed is decelerated gradually from the end point (Xrc) of the last mold opening section Zr towards a mold opening stop position Xe, and a stop controlling section Ze for which a predetermined final stop speed Ve lower than the last speed Vr in the mold opening stop position Xe is set.

In the speed control pattern A, particularly, in the deceleration section Zmd, a time period Td required for the deceleration section Zmd is set and then a time period between the deceleration starting position Xmc of the deceleration section Zmd and the virtual stop position Xso is so controlled as to be the time period Td. Therefore, depending on an actual mold opening speed (current mold opening speed Vd), the end point position Xmc varies. Accordingly, in the case where the current mold opening speed Vd is higher than the set mold opening speed Vm, the end point position Xmc locates ahead of the end point position to be reached at the mold opening speed Vm, whereas in the case where the current mold opening speed Vd is lower than the mold opening speed Vm, the end point position Xmc locates behind the end position reached at the mold opening speed Vm. Thus, by controlling the time period between the deceleration starting position Xmc of the deceleration section Zmd and the virtual stop position Xso to be the fixed required time period Td, more stable and precise position control can be achieved with respect to the virtual stop position Xso. Likewise, in the last deceleration section Zrd, a time period Tr required for the last deceleration section Zrd is set and then a time period between the deceleration starting position Xrc of the last deceleration section Zrd and the mold opening stop position Xe is so controlled as to be the last required time period Tr. Therefore, depending on an actual last speed (current mold opening speed Vd), the end point position Xrc varies. Accordingly, in the case where the current mold opening speed Vd is higher than the set last speed Vr, the end point position Xrc locates ahead of the end point position to be reached at the last speed Vr, whereas in the case where the current mold opening speed Vd is lower than the last speed Vr, the end point position Xrc locates behind the end point position reached at the last speed Vr. Thus, by controlling the time period between the deceleration starting position Xrc of the last deceleration section Zrd and the mold opening stop position Xe to be the fixed last required time period Tr, more stable and precise position control can be achieved with respect to the mold opening stop position Xe.

Meanwhile, in the actual mold open process, the following mold opening control is performed. Firstly, at the inception of the mold open process, a current position of the movable mold Cm is determined. In other words, it is determined whether or not the current mold opening position Xd is 10 mm or less (Step S1). Incidentally, the starting position of the mold opening process is 0 mm. In this case, if the current mold opening position Xd is 10 mm or less, the mold C is in a completely closed state or nearly in that state. Then, mold opening control is performed in a normal mold opening mode. In the normal mode, firstly an initial mold opening processing is performed (Step S2). In the initial mold opening processing, as a speed command value, an initial speed Vf which is lower than the mold opening speed Vm to be mentioned later is used to perform mold opening control in the initial mold opening section Zf shown in FIG. 2. In this way, before the mold opening section Zm to be mentioned later, mold opening is performed at the initial speed Vf lower than the mold opening speed Vm. This makes it possible to perform mold separating processing for separating the movable mold Cm from the fixed mold Cc smoothly and better at the beginning of mold opening.

In this initial mold opening processing, in the hydraulic circuit 32 shown in FIG. 3, both the switching valves M1 and M4 are switched to symbol b. By switching the switching valve M1 to symbol b, the switching valve M2 is switched to symbol b. Meanwhile, other switching valves M3, M5, M6, Mc are maintained in the switching position shown in FIG. 3. According to this, the hydraulic oil of the hydraulic pump 2 is supplied to a front oil room 3f of the mold clamping cylinder 3 via the switching valve M2, which moves the piston 24 backward thereby to open the mold. At this time, as the hydraulic oil of the hydraulic pump 2 is applied to the prefill valve Mp via the switching valve M4, the prefill valve Mp is opened, and then the hydraulic oil of the rear oil chamber 3r of the mold clamping cylinder 3 is flown into the sub-tank 13. Furthermore, the hydraulic oil flowing out from the high-speed cylinder part 62 flows into the switching valve M3 via the switching valve M2, and then is returned to the oil tank 51 through the throttle in the switching valve M3. In other words, meter-out control is performed by means of the meter-out circuit 14. With such a meter-out control being performed, speed control in the initial mold opening section Zf, which is a relatively low speed section, can be performed stably and precisely.

Then, as the initial mold opening section Zf ends and the starting position Xms of the mold opening section Zm is reached, high-speed mold opening processing is performed in the mold opening section Zm (Step S3, S4). In other words, as a speed command value, the high-speed mold opening speed Vm is used to perform mold opening control in the mold opening section Zm shown in FIG. 2. In the mold opening section Zm, the switching valve M3 shown in FIG. 3 is switched to symbol a. This releases the meter-out control. Accordingly, the hydraulic oil flowing out from the high-speed cylinder part 62 is joined into the hydraulic oil supplied from the hydraulic pump 2 via the switching valves M2, M3. In other words, the hydraulic oil joined by a function of the differential circuit 12 is supplied to the front oil chamber 3f. Besides, since the prefill valve Mp is in an open state, when the piston 24 is retracted at high speed, the hydraulic oil of the rear oil chamber 3r of the mold clamping cylinder 3 is escaped into the sub-tank 13 rapidly, thereby realizing a high-speed movement of the piston 24. In this way, in the mold opening section Zm and the deceleration section Zmd mentioned later, the hydraulic oil in the rear oil chamber 3r can be flown into the sub-tank 13. Therefore, mold opening can be performed at higher speed and with higher responsiveness. Particularly, the control method according to the present invention is applied to such a mold clamping device 1c in which mold opening can be performed at higher speed and with higher responsiveness, to achieve a larger effect.

Furthermore, in the mold opening section Zm, based on a current mold opening speed Vd and a current mold opening position Xd, which are both detected, a deceleration starting position Xmc of the deceleration section Zmd where a current mold opening speed Vd becomes a zero (O) at a virtual stop position Xso is sequentially forecasted at each predetermined time interval by calculation and it is determined whether or not the deceleration starting position Xmc is reached. In other words, since the distance Lmd of the deceleration section Zmd is estimated to be Lmd=(Vd·Td)/2, when the condition of Xso−Lmd≦Xd is satisfied, it is determined that the deceleration starting position Xmc is reached, and then the deceleration section Zmd is started (Step S5). In the deceleration section Zmd, based on the detected current mold opening position Xd, a speed command value Dm corresponding to the deceleration section Zmd of the speed control pattern A is obtained sequentially by calculation. According to the speed command value Dm, decelerated mold opening processing is performed (Step S6). This decelerates the mold opening speed gradually. Incidentally, the speed command value Dm can be obtained by the following [Mathematical formula 1].

In [Math. 1], Vds is a current mold opening speed at the time of starting the deceleration section Zmd, Xrs is a starting position of the last mold opening section Zr (FIG. 2), which is after the set last-transition section Zc.

$$Dm = \sqrt{\frac{2 \cdot |Xrs - Xd|}{Vds \cdot Td}} \cdot Vm \qquad \text{[Math. 1]}$$

Then, deceleration control is performed in the deceleration section Zmd. When the current mold opening speed Vd is reached at the last-transition speed Vc, the predetermined stop processing is performed (Step S7). The last-transition speed Vc is set at a speed which is lower than the last speed Vr (for example about 0.5 to 0.8 times of the last speed Vr) in the last mold opening section Zr mentioned later. In addition, mold opening is performed at the last-transition speed Vc. When the starting position Xrs of the set last mold opening section Zr is reached and the last-transition section Zc ends, the last mold opening section Zr is started. In the last mold opening section Zr, the switching valve M3 in the hydraulic circuit 32 is returned to the neutral position so that the same control as in the initial mold opening section Zf mentioned above is performed. Thus, meter-out control by means of the meter-out circuit 14 is performed, and speed control in the last mold opening section Zr and the last deceleration section Zrd to be mentioned later, which are relatively low speed sections, can be performed stably and precisely.

Meanwhile, it is possible that the mold opening is performed at the last-transition speed Vc and then, upon reaching the virtual stop position Xso, the final stop processing is performed. Accordingly, as the virtual stop position Xso, the actual mold opening stop position Xe may be set. In this case, as the final stop processing, the stop control processing in which, at a stop position, any outflow and inflow of the hydraulic oil to the mold clamping cylinder 3 is cut, and operation of the hydraulic pump 2s is delayed for a predetermined time period and then stopped, can be performed. With such a stop control processing being performed, a malfunction in which a mold (movable mold Cm) moves in a closing direction thereof by the pressure inside the hydraulic circuit being negative can be avoided. As a result, the mold can be stably and surely stopped at the mold opening position (Xso).

On one hand, in the last mold opening section Zr, as a speed command value, the last speed Vr lower than the mold opening speed Vm is used, to perform mold opening control in the last mold opening section Zr shown in FIG. 2 (Step S8). In the last mold opening section Zr, based on a current mold opening speed Vd and a current mold opening position Xd, which are both detected, a deceleration starting position Xrc of the last deceleration section Zrd, in which the mold is stopped at the mold opening stop position Xe, is sequentially forecasted at each predetermined time interval by calculation and it is determined whether or not the deceleration starting position Xrc is reached. In other words, since the distance Lrd of the last deceleration section Zrd is estimated to be Lrd=Vd·Tr·(Vr−Ve)/2, when the condition of Xe−Lrd≦Xd is satisfied, it is determined that the deceleration starting position Xrc is reached, and then the last deceleration section Zrd is started (Step S9). In the deceleration section Zrd, based on the detected current mold opening position Xd, a speed command value Dr corresponding to the last deceleration section Zrd of the last speed control pattern Ar is obtained sequentially by calculation. According to the speed command value Dr, decelerated mold opening processing is performed (Step S10). This decelerates the mold opening speed gradually.

Incidentally, the speed command value Dr can be obtained by the following [Mathematical formula 2]. In [Math. 2], Vrs is a current mold opening speed at the time of starting the deceleration section Zrd.

$$Dr = \sqrt{\frac{2 \cdot |Xe - Xd|}{Vrs \cdot Tr}} \cdot (Vr - Ve) + Ve \qquad \text{[Math. 2]}$$

Then, the deceleration control is performed in the deceleration section Zrd, and upon reaching the mold opening stop position Xe the predetermined final stop processing is started (Step S11). In the final stop processing, control in which, at a stop position, any outflow and inflow of the hydraulic oil to the mold clamping cylinder 3 is cut, and operation of the hydraulic pump 2 is delayed for a predetermined time period Te and then stopped is performed. In this case, upon reaching the mold opening stop position Xe, the predetermined time period Te is timed by a delay timer, and when the time is up, the operation of the hydraulic pump 2 is stopped (Step S12, S13, S14). This terminates the stop control section Ze. Incidentally, during timing by the delay timer, a speed for delaying the stop which is set as a speed command value is outputted, and pressure for delaying the stop which is set as a pressure command value is also outputted. With such a final stop control processing being performed, a malfunction in which a mold (movable mold Cm) moves in a closing direction thereof by the pressure inside the hydraulic circuit being negative can be avoided. As a result, the mold can be stably and surely stopped at the mold opening stop position Xe. In addition, as the stop control processing, control in accordance with a preliminarily set last speed control pattern Ar is performed, and then upon reaching the final stop speed Ve the predetermined final stop processing is performed. This makes it possible to stop at the mold opening stop position Xe more stably and precisely.

On the other hand, at the inception of mold opening process, the current position of the movable mold Cm is determined. In the case where the current mold opening position Xd exceeds 10 mm, the mold opening control is performed in the non-high-speed mold opening mode which starts from the abovementioned last mold opening section Zr (Step S1, S8 . . . ). In other words, on starting the mold opening process, if the position of the movable mold Cm has already exceeded 10 mm, it is considered that the movable mold Cm was manually stopped at an arbitrary position for maintenance, testing or the like, that mold opening was emergency-stopped before its completion when a safety door was opened, and so on. In this case, the process is jumped to Step 8 to start mold opening control from the last mold opening section Zr, in which the operation is relatively slow.

Figure 4:
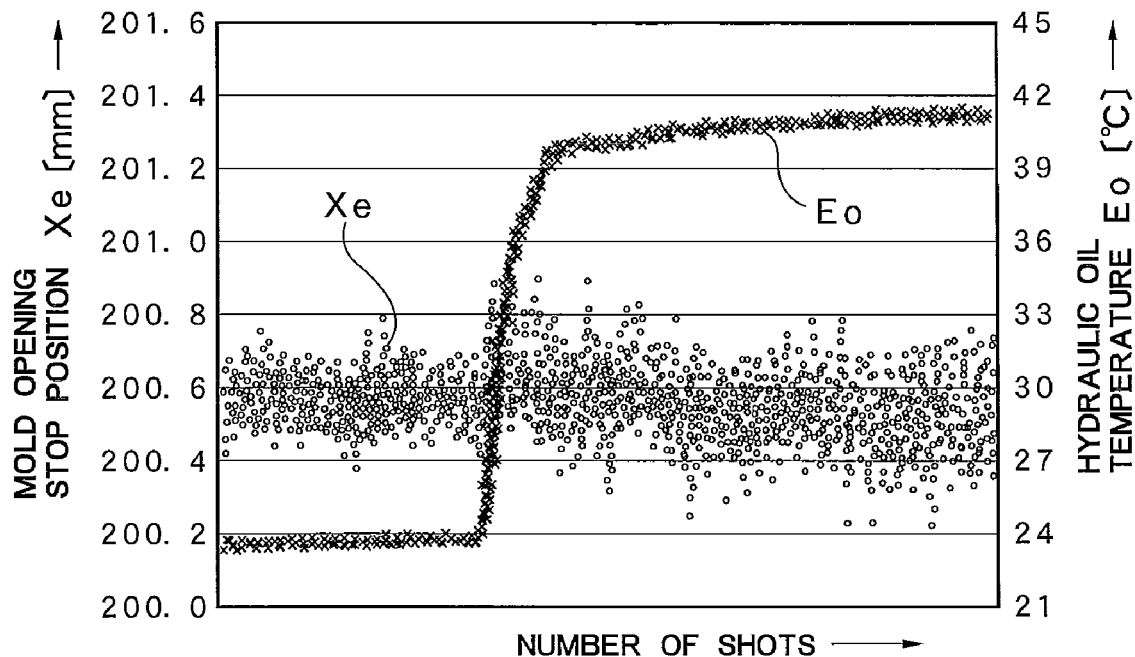
FIG. 4 shows temperatures of hydraulic oil and measurement data of the mold opening stop positions for respective shots when the control method according to the present invention is used.
Figure 5:
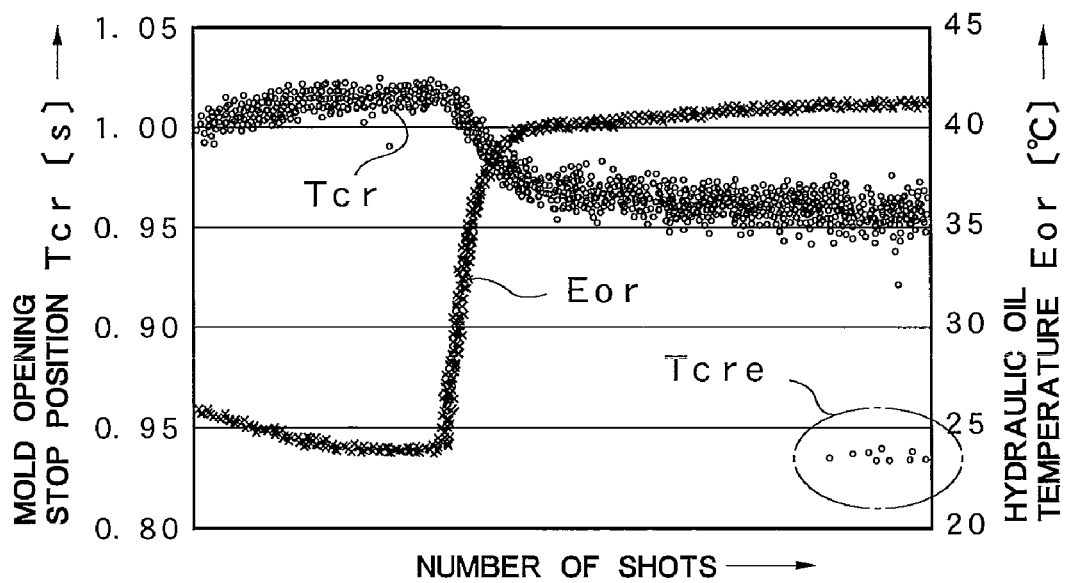
FIG. 5 shows temperatures of hydraulic oil and measurement data of the mold opening stop positions for respective shots when the control method according to the background art is used.

FIG. 4 shows the measurement data of mold opening stop positions Xe for respective shots when the control method according to this embodiment is used and the temperature of the hydraulic oil Eo (° C.) is intentionally changed for 20° C. during sequential operation of the mold clamping device 1c (injection molding machine 1). In this case, the variation range is almost 0.7 mm. For comparison purpose, FIG. 5 shows the measurement data of mold opening stop positions Xer for respective shots when the control method according to this embodiment is not used, but normal feedback control is performed based on a preliminarily set speed command value and the temperature of the hydraulic oil Eor (° C.) is intentionally changed for 20° C. during the sequential operation. In this case, the variation range is almost 1.41 mm. Consequently, using the control method according to this embodiment allows the variation of the mold opening stop positions Xe to be reduced almost by half comparing to a related-art technique.

Figure 6:
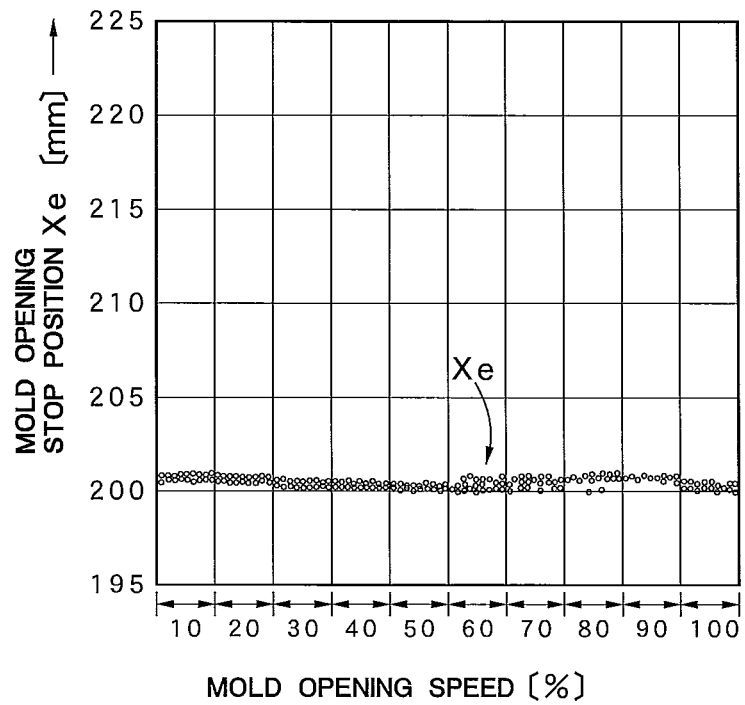
FIG. 6 shows measurement data of the mold opening stop positions with respect to changes of the mold opening speed when the control method according to the embodiment is used.
Figure 7:
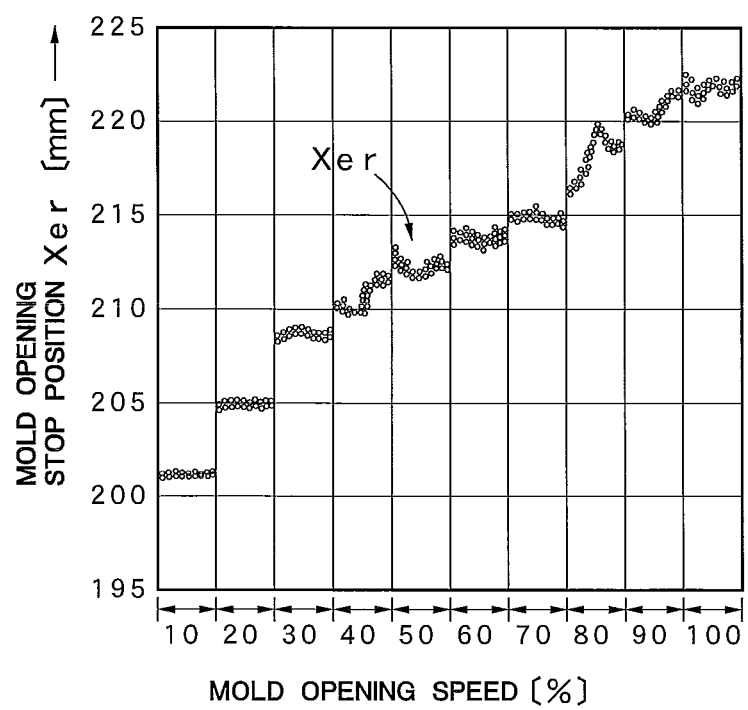
FIG. 7 shows measurement data of the mold opening stop positions with respect to changes of the mold opening speed when the control method according to the background art is used.

In addition, FIG. 6 shows the measurement data of mold opening stop positions Xe for respective shots when the control method according to this embodiment is used and the mold opening speed Vm is changed with respect to the maximum speed in increments of 10% within a range of 10-100%. In this case, the variation range is almost 0.89 mm. For comparison purpose, FIG. 7 shows the measurement data of mold opening stop positions Xe for respective shots when the control method according to this embodiment is not used, but normal feedback control is performed based on a preliminarily set speed command value and the mold opening speed Vm is changed with respect to the maximum speed in increments of 10% within a range of 10-100% during the sequential operation. In this case, the variation range is almost 21.46 mm. As a consequence, using the control method according to this embodiment allows the variation of the mold opening stop positions Xe to be reduced almost by ⅟25 comparing to a related-art technique.

In this way, by performing the mold opening control by the control method according to this embodiment, even though viscosity, volume, and the like of the hydraulic oil in the hydraulic circuit are changed depending on temperature and an inertial force exists in the mold clamping cylinder 3, the mold opening control is so performed as to control according to the preliminarily set speed control pattern A, thereby improving the control precision with respect to a mold opening position (stop positions Xso, Xe) and thus reducing variation in the mold opening positions of respective shots drastically. Consequently, unnecessary overrun of the mold (movable mold) and a trouble such as breakage and damage from colliding a molded product taking-out device with a mold (three-plate mold) can be avoided surely. In addition, conditions can be determined more simply without restriction caused by such troubles. And since a precise mold opening position (stop positions Xso, Xe) can be achieved and variation in mold opening positions of respective shots is reduced, constant molding cycle time can be always secured and a molding cycle time can be accelerated. As a consequence, this makes it possible to avoid lowering and varying the productivity, thereby to smoothly and surely carry out the production schedule and increase productivity.

While the preferable embodiment has been explained in detail, the present invention is not limited to such an embodiment, but in the detail of the hydraulic circuit configuration, techniques, numerical values and the like, any changes, additions, deletions may be made without departing from the spirit and scope of the inventions. For example, as a hydraulic pump 2, a variable discharge type hydraulic pump 2s is illustrated. However, this means that other types of hydraulic pumps 2 are not excluded. A speed control pattern A including the last speed control pattern Ar is not limited to the illustrated pattern, but various forms of patterns are applicable.

INDUSTRIAL APPLICABILITY

Although a mold clamping device 1c of an injection molding machine 1 is illustrated, the control method according to the present invention can be also employed for a mold clamping device in various industrial machines which uses a die (generally, a mold), such as an extruder.

REFERENCE SIGNS LIST

1c: Mold clamping device, 2: Hydraulic pump, 2s: Variable discharge type hydraulic pump, 3: Mold clamping cylinder, 3r: Rear oil chamber of mold clamping cylinder, 11: Drive motor, 13: Sub-tank, 14: Meter-out circuit, A: Speed control pattern, Ar: Last speed control pattern, Zf: Initial mold opening section, Zm: Mold opening section, Zmd: Deceleration section, Zc: Last-transition section, Zr: Last mold opening section, Zrd: Last deceleration section, Ze: Stop control section, Vf: Initial speed, Vm: Mold opening speed, Vc: Last-transition speed, Vr: Last speed, Ve: Final stop speed, Xmc: Deceleration starting position, Xso: Virtual stop position, Xrc: Deceleration starting position, Xe: Mold opening stop position, Dm: Speed command value, Dr: Speed command value, Td: Time period required for deceleration section, Tr: Last time period required for last deceleration section, Te: Predetermined time period

CITATION LIST

Patent Literature 1
JP 09-222924 A

The invention claimed is:

1. A method for controlling a mold clamping device which performs mold opening control by driving a mold clamping cylinder by a variable, discharge-type hydraulic pump which can control a discharge flow rate by varying the control of the number of revolutions of a drive motor, comprising:
preliminarily setting a predetermined speed control pattern including, at least, a mold opening section in which mold opening is performed at a predetermined mold opening speed, a deceleration section in which the speed is gradually decelerated from an end point of the mold opening section toward a virtual stop position, and a last-transition section for which a predetermined last-transition speed is set before the virtual stop position;
in controlling mold opening, in the mold opening section, performing mold opening control at the mold opening speed, and sequentially forecasting, based on a current mold opening speed and a current mold opening position, which are both detected, a deceleration starting position of the deceleration section where a current mold opening speed becomes a zero (O) at the virtual stop position, at each predetermined time interval by calculation;
starting the deceleration section upon reaching the deceleration starting position, and in the deceleration section, obtaining, based on the detected current mold opening position, a speed command value corresponding to the speed control pattern sequentially by calculation, and according to the speed command value, performing decelerated mold opening processing; and
upon reaching the last-transition speed, performing a predetermined stop controlling processing,
wherein, in the deceleration section, a time period required for the deceleration section, and then the time period between a deceleration starting position of the deceleration section and the virtual stop position is so controlled as to be the required time period, and
wherein distance (Lmd) of the deceleration section is estimated to be $Lmd=(Vd \cdot Td)/2$ (wherein Vd is a detected current mold opening speed and Td is a time period required for the deceleration section), when the condition of $Xso - Lmd \leqq Xd$ (wherein Xso is a virtual stop position and Xd is a detected current mold opening position) is satisfied, it is determined that the deceleration starting position is reached.

2. The method for controlling a mold clamping device according to claim 1, wherein, as the drive motor, a servomotor to which a rotary encoder is attached, is employed.

3. The method for controlling a mold clamping device according to claim 1, wherein a sub-tank is attached to the mold clamping cylinder, and in the mold opening section and the deceleration section, control in which the sub-tank is connected to a rear oil chamber of the mold clamping cylinder so as for hydraulic oil in the rear oil chamber to be flowed into the sub-tank, is performed.

4. The method for controlling a mold clamping device according to claim 1, wherein, in the stop control processing, control in which, at a stop position, any outflow and inflow of hydraulic oil to the mold clamping cylinder is cut, and operation of the hydraulic pump is delayed for a predetermined time period and then stopped, is performed.

5. A method for controlling a mold clamping device which performs mold opening control by driving a mold clamping cylinder by a variable, discharge-type hydraulic pump which can control a discharge flow rate by varying the control of the number of revolutions of a drive motor, comprising:

preliminarily setting a predetermined speed control pattern including, at least, a mold opening section in which mold opening is performed at a predetermined mold opening speed, a deceleration section in which the speed is gradually decelerated from an end point of the mold opening section toward a virtual stop position, and a last-transition section for which a predetermined last-transition speed is set before the virtual stop position;

in controlling mold opening, in the mold opening section, performing mold opening control at the mold opening speed, and sequentially forecasting, based on a current mold opening speed and a current mold opening position, which are both detected, a deceleration starting position of the deceleration section where a current mold opening speed becomes a zero (O) at the virtual stop position, at each predetermined time interval by calculation;

starting the deceleration section upon reaching the deceleration starting position, and in the deceleration section, obtaining, based on the detected current mold opening position, a speed command value corresponding to the speed control pattern sequentially by calculation, and according to the speed command value, performing decelerated mold opening processing; and upon reaching the last-transition speed, performing a predetermined stop controlling processing wherein, in the stop control processing, control in which, at a stop position, any outflow and inflow of hydraulic oil to the mold clamping cylinder is cut, and operation of the hydraulic pump is delayed for a predetermined time period and then stopped, is performed, a predetermined last speed control pattern is set, the pattern including a last mold opening section in which mold opening is performed at a last speed set at a speed lower than the mold opening speed, and a last deceleration section in which the speed is decelerated gradually from an end point of the last mold opening section toward a mold opening stop position, and a stop controlling section for which a predetermined final stop speed lower than the last speed in the mold opening stop position is set, in performing the stop control processing, in the last mold opening section, mold opening control is performed at the last speed, and based on a current mold opening speed and a current mold opening position which are both detected, a deceleration starting position of the last deceleration section in which the mold is stopped at the mold opening stop position is calculated at each predetermined time interval to be sequentially forecasted, upon reaching the deceleration starting position the last deceleration section is started, and in the last deceleration section, based on a detected current mold opening position, a speed command value corresponding to the last speed control pattern is obtained sequentially by calculation, and according to the speed command value, deceleration control is performed, and upon reaching the final stop speed, a predetermined final stop processing is performed, wherein distance (Lrd) of the last deceleration section is estimated to be Lrd=Vd·Tr·(Vr−Ve)/2 (wherein Vd is a detected current mold opening speed, Tr is a last time period required for the last deceleration section, Vr is a last speed, and Ve is a final stop speed), when the condition of Xe−Lrd≦Xd (wherein Xe is a mold opening stop position, and Xd is a detected current mold opening position) is satisfied, it is determined that the deceleration starting position is reached.

6. The method for controlling a mold clamping device according to claim 5, wherein, in the last deceleration section, a last time period required for the last deceleration section is set, and then the time period between a deceleration starting position of the last deceleration section and the mold opening stop position is so controlled as to be the last required time period.

7. The method for controlling a mold clamping device according to claim 5, wherein, in the last mold opening section and the last deceleration section, the mold clamping cylinder is connected to a meter-out circuit to perform meter-out control.

8. The method for controlling a mold clamping device according to claim 5, wherein, in the final stop processing, control in which, at a stop position, any outflow and inflow of hydraulic oil to the mold clamping cylinder is cut, and operation of the hydraulic pump is delayed for a predetermined time period and then stopped, is performed.

9. The method for controlling a mold clamping device according to claim 5, wherein at the inception of the mold open process, a current mold opening position is determined whether or not the current mold opening position is 10 mm or less (the starting position of the mold opening process is 0 mm), and then if the current mold opening position is 10 mm or less, mold opening control is performed in a normal mold opening mode which starts from a current mold opening position, whereas if the current mold opening position exceeds 10 mm, the mold opening control is performed in a non-high-speed mold opening mode which starts from the last mold opening section.

10. The method for controlling a mold clamping device according to claim 1, wherein, before the mold opening section, an initial mold opening section in which mold opening is performed at an initial speed lower than the mold opening speed is set.

11. The method for controlling a mold clamping device according to claim 10, wherein, in the initial mold opening section, the mold clamping cylinder is connected to a meter-out circuit to perform meter-out control.

12. The method for controlling a mold clamping device according to claim 1, wherein the mold clamping device is arranged in an injection molding machine.

13. A method for controlling a mold clamping device which performs mold opening control by driving a mold clamping cylinder by a variable, discharge-type hydraulic pump which can control a discharge flow rate by varying the control of the number of revolutions of a drive motor, comprising:

preliminarily setting a predetermined speed control pattern including, at least, a mold opening section in which mold opening is performed at a predetermined mold opening speed, a deceleration section in which the speed is gradually decelerated from an end point of the mold opening section toward a virtual stop position, and a last-transition section for which a predetermined last-transition speed is set before the virtual stop position;

in controlling mold opening, in the mold opening section, performing mold opening control at the mold opening speed, and sequentially forecasting, based on a current mold opening speed and a current mold opening position, which are both detected, a deceleration starting position of the deceleration section where a current mold opening speed becomes a zero (O) at the virtual stop position, at each predetermined time interval by calculation;

starting the deceleration section upon reaching the deceleration starting position, and in the deceleration section, obtaining, based on the detected current mold opening position, a speed command value corresponding to the speed control pattern sequentially by calculation, and according to the speed command value, performing decelerated mold opening processing; and upon reaching the last-transition speed, performing a predetermined stop controlling processing, wherein, in the deceleration section, a time period required for the deceleration section, and then the time period between a deceleration starting position of the deceleration section and the virtual stop position is so controlled as to be the required time period, and wherein the speed command value (Dm) is obtained by the following mathematical formula:

$$Dm = \sqrt{\frac{2 \cdot |Xrs - Xd|}{Vds \cdot Td}} \cdot Vm$$

(wherein Xrs is a starting position of a last mold opening section, which is performed after the set last-transition section, Vds is a current mold opening speed at the time of starting the deceleration section, and Vm is a set mold opening speed).

14. A method for controlling a mold clamping device which performs mold opening control by driving a mold clamping cylinder by a variable, discharge-type hydraulic pump which can control a discharge flow rate by varying the control of the number of revolutions of a drive motor, comprising:

preliminarily setting a predetermined speed control pattern including, at least, a mold opening section in which mold opening is performed at a predetermined mold opening speed, a deceleration section in which the speed is gradually decelerated from an end point of the mold opening section toward a virtual stop position, and a last-transition section for which a predetermined last-transition speed is set before the virtual stop position;

in controlling mold opening, in the mold opening section, performing mold opening control at the mold opening speed, and sequentially forecasting, based on a current mold opening speed and a current mold opening position, which are both detected, a deceleration starting position of the deceleration section where a current mold opening speed becomes a zero (O) at the virtual stop position, at each predetermined time interval by calculation;

starting the deceleration section upon reaching the deceleration starting position, and in the deceleration section, obtaining, based on the detected current mold opening position, a speed command value corresponding to the speed control pattern sequentially by calculation, and according to the speed command value, performing decelerated mold opening processing; and upon reaching the last-transition speed, performing a predetermined stop controlling processing wherein, in the stop control processing, control in which, at a stop position, any outflow and inflow of hydraulic oil to the mold clamping cylinder is cut, and operation of the hydraulic pump is delayed for a predetermined time period and then stopped, is performed, a predetermined last speed control pattern is set, the pattern including a last mold opening section in which mold opening is performed at a last speed set at a speed lower than the mold opening speed, and a last deceleration section in which the speed is decelerated gradually from an end point of the last mold opening section toward a mold opening stop position, and a stop controlling section for which a predetermined final stop speed lower than the last speed in the mold opening stop position is set, in performing the stop control processing, in the last mold opening section, mold opening control is performed at the last speed, and based on a current mold opening speed and a current mold opening position which are both detected, a deceleration starting position of the last deceleration section in which the mold is stopped at the mold opening stop position is calculated at each predetermined time interval to be sequentially forecasted, upon reaching the deceleration starting position the last deceleration section is started, and in the last deceleration section, based on a detected current mold opening position, a speed command value corresponding to the last speed control pattern is obtained sequentially by calculation, and according to the speed command value, deceleration control is performed, and upon reaching the final stop speed, a predetermined final stop processing is performed, wherein, in the last deceleration section, a last time period required for the last deceleration section is set, and then the time period between a deceleration starting position of the last deceleration section and the mold opening stop position is so controlled as to be the last required time period, and wherein the speed command value (Dr) is obtained by the following mathematical formula:

$$Dr = \sqrt{\frac{2 \cdot |Xe - Xd|}{Vrs \cdot Tr}} \cdot (Vr - Ve) + Ve$$

(wherein Vrs is a current mold opening speed at the time of starting the deceleration section).

* * * * *